US011126856B2

United States Patent
Mehta et al.

(10) Patent No.: US 11,126,856 B2
(45) Date of Patent: Sep. 21, 2021

(54) CONTEXTUALIZED VIDEO SEGMENT SELECTION FOR VIDEO-FILLED TEXT

(71) Applicant: Adobe Inc., San Jose, CA (US)

(72) Inventors: Saurabh Mehta, Noida (IN); Saurabh Gupta, Noida (IN); Sameer Bhatt, Noida (IN)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 16/599,387

(22) Filed: Oct. 11, 2019

(65) Prior Publication Data
US 2021/0110164 A1 Apr. 15, 2021

(51) Int. Cl.
G06K 9/00 (2006.01)
G06K 9/32 (2006.01)
G11B 27/34 (2006.01)

(52) U.S. Cl.
CPC ..... *G06K 9/00744* (2013.01); *G06K 9/00275* (2013.01); *G06K 9/00758* (2013.01); *G06K 9/3233* (2013.01); *G11B 27/34* (2013.01)

(58) Field of Classification Search
None
See application file for complete search history.

(56) References Cited

U.S. PATENT DOCUMENTS

2020/0065612 A1\* 2/2020 Xu ..................... G06K 9/00302
2020/0066014 A1\* 2/2020 Mehta ................. G06F 16/5866
2020/0273493 A1\* 8/2020 Huber .................. G11B 27/031

OTHER PUBLICATIONS

Justin Odisho, "VIDEO in TEXT Shape Effect—How to Animate Letter by Letter (Adobe Premiere Pro CC Tutorial)," May 18, 2017. Youtube link: https://www.youtube.com/watch?v=uVN-Zx6U6SM (Year: 2017).\*
Barnard et al., "Matching Words with Pictures," Journal of Machine Learning Research 3 (2003) 1107-1135 (Year: 2003).\*
Yang et al., "Dense Captioning with Joint Interference and Visual Context," 2017 IEEE Conference on Computer Vision and Pattern Recognition (Year: 2017).\*
Johnson et al., "DenseCap: Fully Convolutional Localization Networks for Dense Captioning," CVPR, Nov. 24, 2015. (Year: 2015).\*

(Continued)

*Primary Examiner* — Soo Shin
(74) *Attorney, Agent, or Firm* — Kilpatrick Townsend & Stockton LLP

(57) ABSTRACT

A video editing application generates video-filled text based on context-sensitive video segments. For example, the video editing application receives a text selection including multiple characters. A text selection context that identifies a characteristic of the text selection is determined, the context including a category of the text selection and a tag identifying an entity associated with the text selection. Scores are computed for multiple video segments, each score indicating a match between an attribute of the respective video segment and the text selection context. Video segments with attributes that match the context are selected, based on a comparison of each score to a threshold. The video editing application generates a composite video that includes a combination of a selected video segment and a character from the text selection, the combination including an outline of the character and the selected video segment.

20 Claims, 10 Drawing Sheets

(56) References Cited

OTHER PUBLICATIONS

Odisho, Justin, "Video in Text Shape Effect—How to Animate Letter by Letter" (Adobe Premiere Pro CC 2017 Tutorial), YouTube, https://www.youtube.com/watch?v=uVN-Zx6U6SM, May 18, 2017, 4 pages.

\* cited by examiner

CONTEXTUALIZED VIDEO SEGMENT SELECTION FOR VIDEO-FILLED TEXT

TECHNICAL FIELD

This disclosure relates generally to the field of video editing, and more specifically relates to video segment selection.

BACKGROUND

Video displayed within text is a very popular visual effect. A user, such as a graphical designer, who is creating a video or animated presentation may desire to embed a video within text to make the creation more interesting and engaging. However, contemporary video editing tools to create video-filled text may be difficult to use, such that only experienced users with extensive knowledge of the contemporary tools are able to create video-filled text. In some cases, a contemporary video editing tool requires extensive manual adjustments to create text that includes video filling each character, such as manipulation of multiple video layers and matte layers, selection and time editing of video segments, adjustment of the size and centering of video segments to match text, and additional manual steps to create the video-filled text. An amateur user may be frustrated or confused by contemporary video editing tools, and may be unable to create video-filled text.

In addition to having familiarity with contemporary video editing tools, a user also needs to determine which portion of the video from the complete recorded video would match the message of the text. Contemporary video editing tools may fail to offer context-sensitive video selections to accompany the message of the text.

SUMMARY

According to certain embodiments, a video editing application receives a text selection that includes multiple character elements. A context determination module in the video editing application determines a text selection context that identifies a characteristic of the text selection. The text selection context includes one or more of a tag that identifies an entity associated with the text selection, or a context definition that identifies a category associated with the text selection. A video analysis module in the video editing application computes a first score for a first video segment and a second score for a second video segment. Each score is computed based on a match between an attribute of the respective video segment and the text selection context. The video analysis module compares a score of a respective video segment to a segment threshold. Based on the comparison, the video analysis module determines that the first score fulfills the segment threshold and the second score does not fulfill the segment threshold.

Responsive to determining that the first score fulfills the segment threshold, the video editing application generates a composite video that includes a combination of the first video segment and a character element from the text selection. The combination includes an outline of the character element superimposed on the first video segment. The video editing application updates a user interface to display the composite video.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
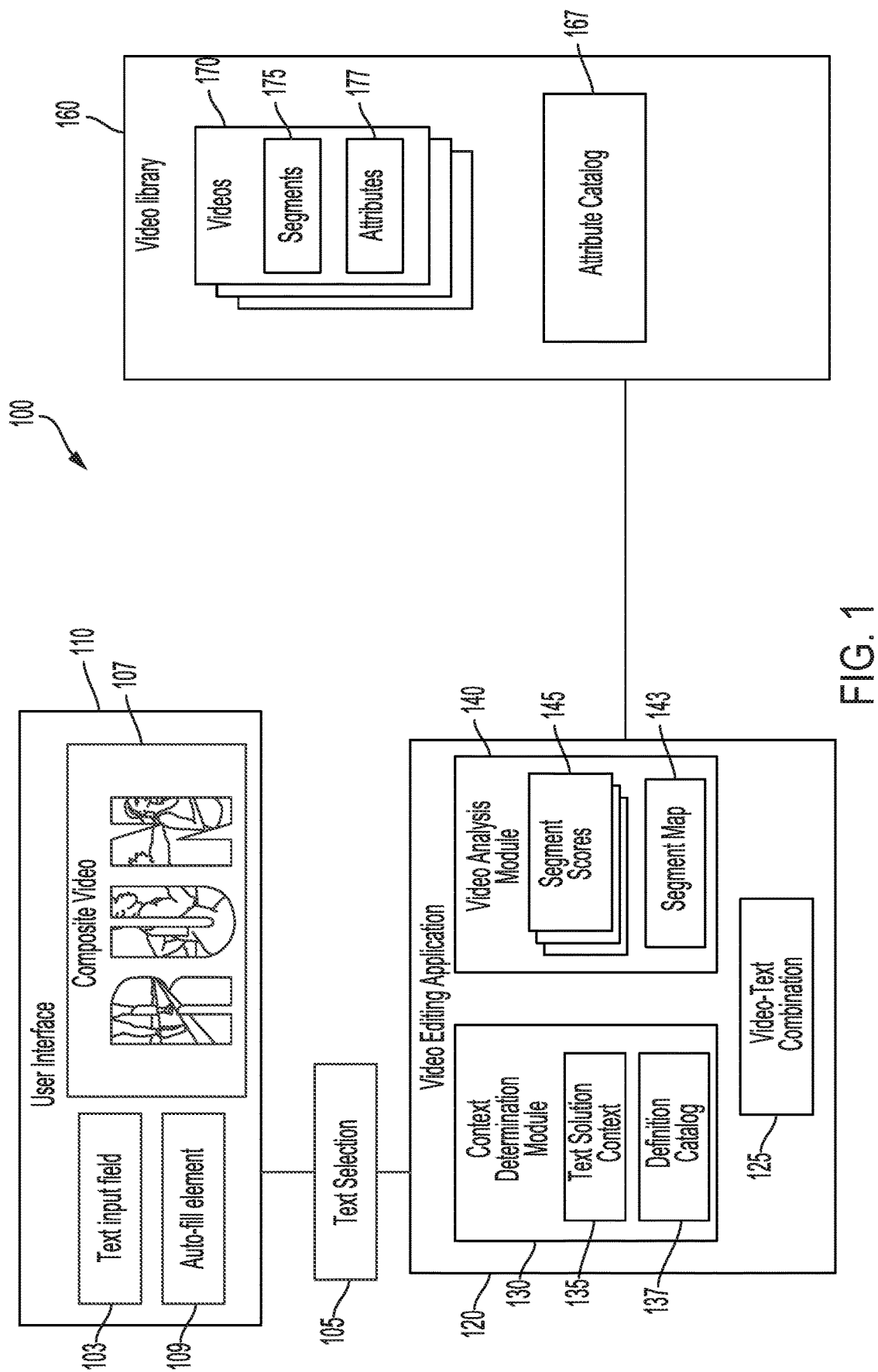
FIG. 1 is a block diagram depicting an example of a computing environment configured to select context-sensitive video segments for video-filled text, according to certain embodiments.

As discussed above, contemporary techniques for editing video do not provide for automatically generating text that is filled with video. Certain embodiments described herein provide techniques to automatically generate video-filled text based on a text selection entered by a user. In some cases, a video editing application that automatically generates the video-filled text selects contextualized video segments that match a context of the text selection. The video editing application generates, for example, text that is filled with video segments that display content matching the text selection's context or meaning.

The following example is provided to introduce certain embodiments of the present disclosure. In this example, a video editing application receives a text selection, such as from a user who wishes to generate a video that includes a combination of video footage and the text selection. The video editing application determines a context for a word or other characters included in the text selection. The context indicates, for example, if the text selection is a person's name, a location, or a term defined in a definition catalog.

Based on the context, the video editing application determines one or more video segments that match (or are similar to) the context of the text selection. For instance, the video editing application determines scores for various video segments, where each score indicates a degree to which the scored video segment matches the context of the text selection. The video editing application selects video segments having scores that exceed (or otherwise fulfill) a threshold value. A combination of the selected video segments and the text selection is generated by the video editing application, such that each character in the text selection is superimposed on one or more video segments that match the context of the text selection. The video editing application generates a composite video depicting the superimposed text selection and related video segments. The composite video is displayed, for example, via a user interface, such as to the user who provided the text selection.

Techniques for automatic generation of video-filled text may enable a user to more readily create their desired video or animated content, allowing an amateur user to access advanced editing tools. In addition, automatic generation of video-filled text may save time and improve efficiency for users, such as by selecting video segments that are consistent with a context of the text that is filled in by the video segments. Certain embodiments provide improvements to computing systems used for generating or editing video content. For instance, as discussed above, existing techniques often entail cumbersome or time-consuming processes for generating multimedia content having video displayed within text. Embodiments described herein can avoid these cumbersome or time-consuming processes by implementing an automated process for creating text-filled video. In this automated process, video is positioned within textual content in accordance with particular rules applied by a computing system in a manner that reduces or eliminates the need for subjective judgments and/or manual efforts involved in prior techniques. For instance, a video editing application described herein uses various rules that identify video segments whose content match or are otherwise similar to characteristics of a text selection, such as a person's name, a location, or semantic meaning of the text selection. The particular rules used to automate this process can improve the operation of software tools used to create multimedia content, e.g., by reducing the manual effort associated with techniques performed with existing tools.

Referring now to the drawings, FIG. 1 is a diagram depicting a computing environment 100 in which context-sensitive video segments are selected for video-filled text. The computing environment 100 includes a video editing application 120, a video library 160, and a user interface 110. The video editing application 120 provides (or is otherwise in communication with) the user interface 110. Additionally or alternatively, the video editing application 120, the video library 160, and the user interface 110 are implemented on one or more computing systems that are configured to communicate via one or more computing networks. As a non-limiting example, the video editing application 120 could operate on a computing system that communicates with an additional computing system on which the video library 140 operates. In some cases, one or more of the video editing application 120, the video library 160, or the user interface 110 are implemented on a particular computing system, such as a personal computer, laptop, or tablet computing device. Additionally or alternatively, one or more of the video editing application 120, the video library 160, or the user interface 110 are implemented on multiple computing systems such as servers, virtual computing systems (e.g., cloud computing resources, software-as-a-service), a computing device cluster, or other computing systems (including virtual computing systems) that are configured to operate together.

In FIG. 1, the video library 160 includes multiple videos, such as videos 170. Each one of the videos 170 includes one or more respective segments included in segments 175. A segment of a video includes a sequence of frames from the video. In a particular video of the videos 170, for instance, the respective segments 175 indicate a sequence of video frames that display an amount of content for the particular video. Additionally or alternatively, each one of the videos 170 is associated with one or more respective attributes, such as attributes 177. An attribute of a video (or of a segment) indicates, for instance, a characteristic of the video (or of the segment). For example, a video could have attributes indicating content of the video, technical characteristics of the video, or filming characteristics of the video.

In some cases, the video library includes an attribute catalog 167 that describes the attributes of the videos. The attribute catalog 167 is a software structure, such as a database or an array, that is capable of storing or organizing the attributes 177 of the videos 170. The attribute catalog 167 indicates an association between a particular video of the videos 170 and attributes that are associated with the particular video. As a non-limiting example, the attribute catalog 167 indicates that a first video has the attributes "Sam," "birthday," "high resolution," and "indoor lighting," while a second video has the attributes "Sam," "marathon," "low resolution," and "outdoor lighting." In some cases, the attributes include tags, such as a tag including a small amount of text (or other datatype) describing the attribute. Additionally or alternatively, the attribute includes a flag or other software indicator, such as a flag indicating a face recognized across multiple videos in the videos 170. In some cases, the video library 170 receives an input (e.g., from the user interface 110) indicating an attribute, such as an input indicating a tag entered by the user.

In some embodiments, the user interface 110 is configured to provide one or more user interface elements that are capable of receiving inputs from a user, or providing output to a user, or both. In FIG. 1, the user interface 110 provides a text input field 103 that is configured to receive one or more characters of text entered by a user. The entered characters are indicated as a text selection 105. The user interface 110 can indicate that the text selection 105 is to be used to generate a composite video 107 having video-filled text. The composite video 107 includes video-filled text, in which shapes of the characters in the text selection 105 are filled with one or more video segments, such as segments selected from the segments 175.

In some cases, the user interface 110 receives input indicating that the text selection 105 is to be included in a video title (i.e., text displayed concurrently with video footage). The video editing application 120 can receive this input via an interaction with a user interface element, such as a button, a menu item, or another control. In FIG. 1, an interaction with an auto-fill element 109 identifies the text selection 105 as a video title for the composite video 107. For instance, if the text input field 103 receives the characters "RUN" as an input, the text selection 105 may have an indication that "RUN" is the video title, and the composite video 107 may include video segments that fill the shapes of each of the letter characters R, U, and N. In some cases, the video editing application 120 receives, via the user interface 110, an additional input that selects, identifies, or otherwise indicates one or more videos stored in the library 160. The video editing application 120 may respond to such an input by, for example, analyzing the videos indicated by the additional input.

The video editing application 120 depicted in FIG. 1 also includes one or more of a context determination module 130 or a video analysis module 140. The context determination module 130 can determine a text selection context 135 from one or more characteristics of the text selection 105. The characteristics are determined by comparing the text selection 105 to entries in one or more catalogs, such as a definition catalog 137 or an attribute catalog 167. The context determination module 130 identifies one or more catalog entries that match the text selection 105, and identifies the matching catalog entries as characteristics of the text selection 105.

In FIG. 1, the context determination module 130 compares the text selection 105 to an entry in the attribute catalog 167, such as a tag attribute that is associated with one of the videos 170. The context determination module 130 determines that the tag identifies an entity (e.g., a subject of the tag) that is associated with the text selection 105. As an example, if the text selection 105 includes the characters "sam," the context determination module 130 could determine that the text selection 105 is associated with one or more tags identifying "Sam," "Samantha," "sample," or other entities that are tagged by the characters "sam." The context determination module 130 of FIG. 1 also compares the text selection 105 to an entry in the definition catalog 137, such as a context definition that identifies a category. The context determination module 130 determines that the context definition identifies a category that is associated with the text selection 105. If the text selection 105 includes the examples of characters "run," the context determination module 130 could determine that the text selection 105 is associated with one or more context definitions identifying "run," "running," "sports," or other defined categories that are associated with the characters "run." In some cases, the context 135 identifies a combination of characteristics. For example, if the text selection 105 includes the characters "Sam's marathon," the context 135 could identify the combination of characteristics "Sam," "running," and "sports," based on a "Sam" tag attribute in the catalog 167 and definitions "running" and "sports" in the definition catalog 137.

In FIG. 1, the definition catalog 137 is included in the video editing application 120 and the attribute catalog is included in the video library 160, but other implementations are possible. As an example of an implementation, both catalogs 137 and 167 could be included in one or more of the application 120 or the library 160. As an additional example of an implementation, one of more of the catalogs 137 and 167 could be included on an additional computing system that is accessible by the application 120 or the library 160 via a network.

In some embodiments, the video analysis module 140 is configured to compute a score for a video segment by determining a match between the text selection context 135 and the video attributes 177. The video analysis module 140 computes segment scores 145 by comparing the context 135 with respective attributes associated with each of the segments 175. For each particular segment of the segments 175, a respective score is determined based on a match between one or more characteristics identified by the context 135 and one or more attributes associated with the particular segment. In some cases, video analysis module 140 modifies the score for a particular segment responsive to determining multiple matches between the context 135 and the attributes associated with the particular segment. If the context 135 identifies the examples of characteristics of "Sam," "running," and "sports," a segment having attributes of "Sam" and also "running" could have a score that is increased (or otherwise modified) as compared to an additional score of an additional segment having the attribute of "Sam" without "running," or "running" without "Sam."

The video analysis module 140 selects one or more of the segments 175, such as by comparing each of the segment scores 145 to a segment threshold. As an example, the video analysis module determines that a first segment has a first score that fulfills the threshold, and that a second segment has a second score that does not fulfill the threshold. The video analysis module 140 provides an indication of one or more segments having scores that fulfill the segment threshold. In some cases, the video analysis module 140 provides to the video editing application 120 a segment map 143 that indicates one or more videos having segments that fulfill the threshold. The map 143 is a software structure, such as an array, a database table, or any other software structure suitable for indicating segment characteristics for multiple videos. The map 143 includes data describing the segments, such as the respective score, a timestamp of each segment's beginning or end, an indication of object regions (e.g., faces, salient objects) within each segment, or other qualities of the mapped segments. In some cases, the map 143 indicates one or more segments that do not fulfill the segment threshold. For instance, the map 143 could indicate a video having at least one segment that fulfills the threshold and at least one additional segment that does not fulfill the threshold.

In the computing environment 100, the video editing application generates a combination, such as a video-text combination 125, that includes the text selection 105 and one or more segments 175 having scores 145 that fulfill the segment threshold. The video-text combination 125 includes multiple layers (i.e., working areas in a video editing file) that are configured to include video data. In some cases, the video-text combination 125 includes a layer for each character of the text selection 105. For instance, if the text selection 105 includes the characters "RUN," as diagrammatically shown in the example of the composite video 107, the video-text combination 125 includes a first layer for the character R, a second layer for the character U, and a third layer for the character N. Each of these examples of layers includes a video matte, such as an inverse matte that is transparent within the shape of the respective character (e.g., within the boundaries of the R character shape) and covers areas outside of the character shape (e.g., outside of the shape of the character R). The video-text combination 125 also includes one or more layers for a respective video segment that is displayed within a particular character. Continuing with the examples of characters "RUN," the video-text combination 125 includes a fourth layer for a video segment configured for display within the R, a fifth layer for another video segment configured for display within the U, and a sixth layer for yet another video segment configured for display within the N. In some cases, multiple video segments are configured for display within a particular letter. For the character R, the video editing application 120 could select multiple video segments with scores that fulfill the segment threshold, as indicated by the map 143. The multiple selected video segments could be combined (e.g., spliced, overlaid, crossfade) for display within the character R.

In some embodiments, the video editing application 120 generates a composite video, such as the composite video 107, based on a video-text combination, such as the video-text combination 125. The composite video 107 is configured to play as a video file, such as for display on a laptop, smartphone, or other computing device. For example, the video editing application 120 renders (or otherwise converts) the video data on the multiple layers of the video-text combination 125. The rendered video data is combined into a video file (or other data type), such as the composite video 107. In some cases, the composite video 107 is displayed via an output of the user interface 110. Additionally or alternatively, the composite video 107 is provided to an additional computing system (such as, without limitation, the video library 160) via a network.

Figure 2:
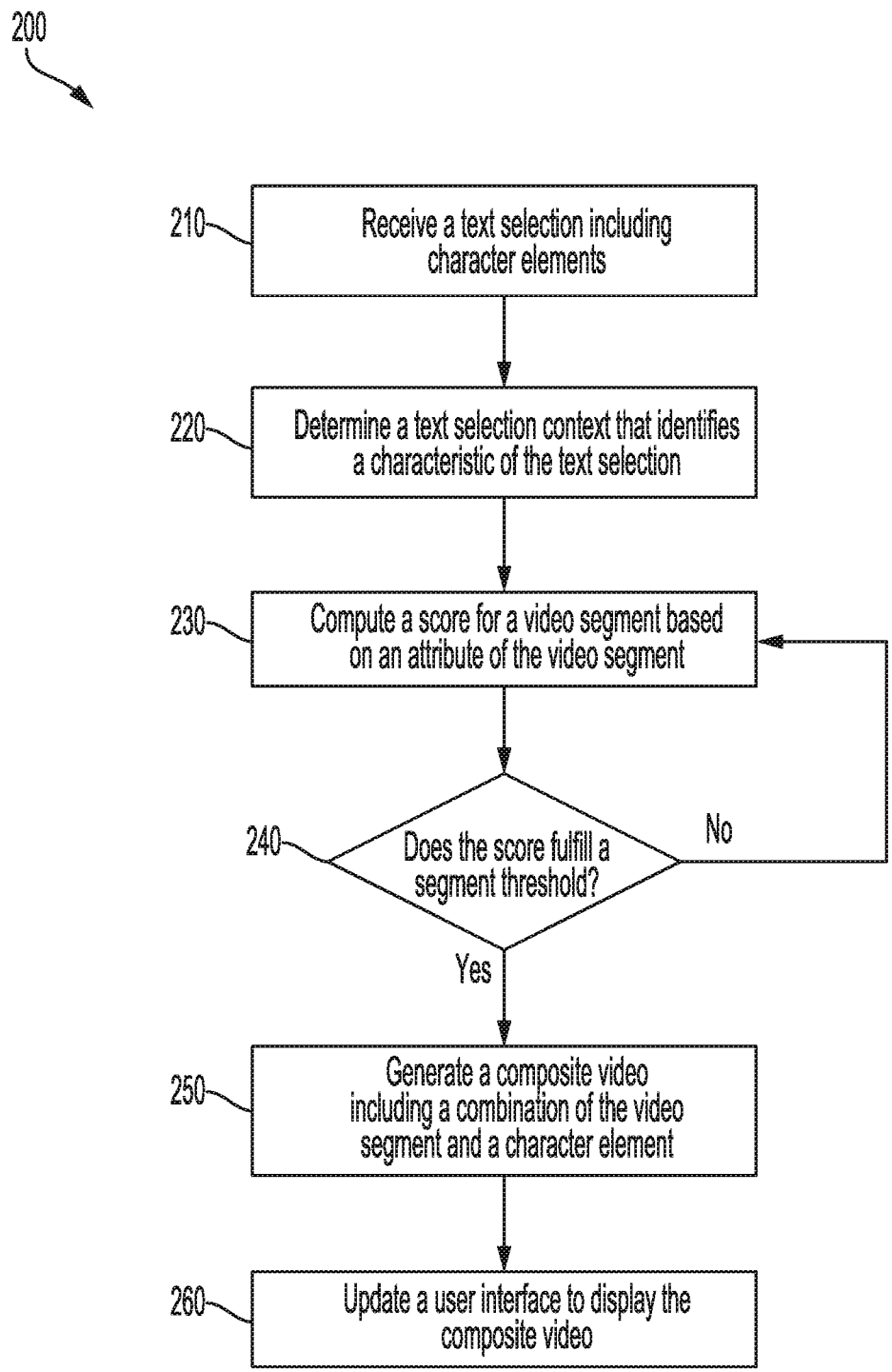
FIG. 2 is a flow chart depicting an example of a process for generating video-filled text using contextualized video segments, according to certain embodiments.

FIG. 2 is a flow chart depicting an example of a process 200 for generating video-filled text using contextualized video segments. In some embodiments, such as described in regards to FIGS. 1-2, a computing device executing a video editing application implements operations described in FIG. 2, by executing suitable program code. For illustrative purposes, the process 200 is described with reference to the examples depicted in FIG. 1. Other implementations, however, are possible.

At block 210, the process 200 involves receiving a text selection that includes one or more character elements, such as alphanumeric character data. In some embodiments, the video editing application 120 receives the text selection 105 via an element of a user interface, such as the text input field 103 in the user interface 110. In some cases, the video editing application 120 also receives, via one or more additional elements of the user interface, a manipulation of the text selection. For instance, the video editing application 120 receives input specifying a change to a font size or style of the text selection 105. In some cases, the video editing application 120 can compute an area of each letter displayed in the composite video 107 based on a font size or style indicated by the received input.

At block 220, the process 200 involves determining a context of the text selection. In some cases, the text selection context identifies one or more characteristics of the text selection. The determined text selection context includes one or more of a tag or a context definition. The tag identifies, for instance, an entity associated with the text selection, such as an entity that is tagged in an attribute catalog. The context definition identifies, for instance, a category that is associated with the text selection, such as a category that is indicated in a definitions catalog. The context determination module 130 compares the received text selection 105 to entries in the definition catalog 137 and the attribute catalog 167. The context determination module 130 can identify a characteristic of the text selection 105 by determining a match between the text selection 105 and one or more of the catalog entries. The context determination module 130 includes the identified characteristic in the text selection context 135. In some cases, the context determination module 130 identifies the characteristic by determining that the text selection 105 and the catalog entry are within (or have another suitable relation to) a threshold similarity.

At block 230, the process 200 involves computing a score for a video segment based on an attribute of the segment, by comparing one or more attributes of the video segment to the text context. In some embodiments, the video analysis module 140 determines a match between the text selection context and respective attributes of multiple segments from the video segments 175. The video analysis module determines a respective score for each of the multiple segments, such as the segment scores 145. For instance, the video analysis module 140 computes a first score for a first video segment, by determining a match between the text selection context 135 and one or more attributes of the first video segment. In addition, the video analysis module 140 computes a second score for a second video segment, by determining an additional match between the text selection context 135 and one or more additional attributes of the second video segment.

At block 240, the process 200 involves determining whether a score for a respective video segment fulfills a value of a segment threshold. For example, the video analysis module 140 can determine whether or not the first video segment fulfills the segment threshold by comparing the first score for the first video segment to the segment threshold. Also, the video analysis module can determine whether or not the second video segment fulfills the threshold by comparing the second score for the second video segment to the segment threshold.

In some embodiments, operations related to one or more of blocks 230 or 240 are repeated for multiple video segments, such as for each segment 175 included in the videos 170. For instance, if operations related to block 240 determine that a respective score for a respective video segment fulfills the segment threshold, the process 200 proceeds to another block, such as block 250. If operations related to block 240 determine that the respective score does not fulfill the segment threshold, the process 200 proceeds to another block, such as one or more of blocks 230 or 240 (e.g., determining an additional score for an additional video segment).

At block 250, the process 200 involves generating a composite video. In some cases, the composite video includes a combination of one or more video segments having respective scores that fulfill the segment threshold and one or more character elements from the text selection. In some cases, the combination of at least one video segment and character element includes an outline of the character element superimposed with the video segment. The video editing application 120 generates one or more of the composite videos 107 or the video-text combination 125 using character elements from the text selection 105 and multiple video segments that fulfill the segment threshold, such as the first video segment described in regards to block 240. The video-text combination 125 includes (or otherwise indicates) the first video segment superimposed with an outline of a character element from the text selection 105. The composite video 107 is generated by the video editing application 120 by rendering (or otherwise converting to a playable video file) the video-text combination 125.

At block 260, the process 200 involves updating the user interface to display the generated composite video. The user interface 110, or an included display component, is configured to display the composite video 107. In some cases, the composite video 107 is displayed as a playable video file that includes video data rendered to play on a suitable video playback application, such as a playback application displayed via the user interface 110. Additionally or alternatively, the composite video 107 is displayed as an editable video file that includes one or more layers of graphical data editable in a suitable video editing application, such as video editing application 120. In some cases, the composite video 107 is provided to an additional computing system, such as to a video library or a personal computer, via one or more computing networks.

Figure 3:
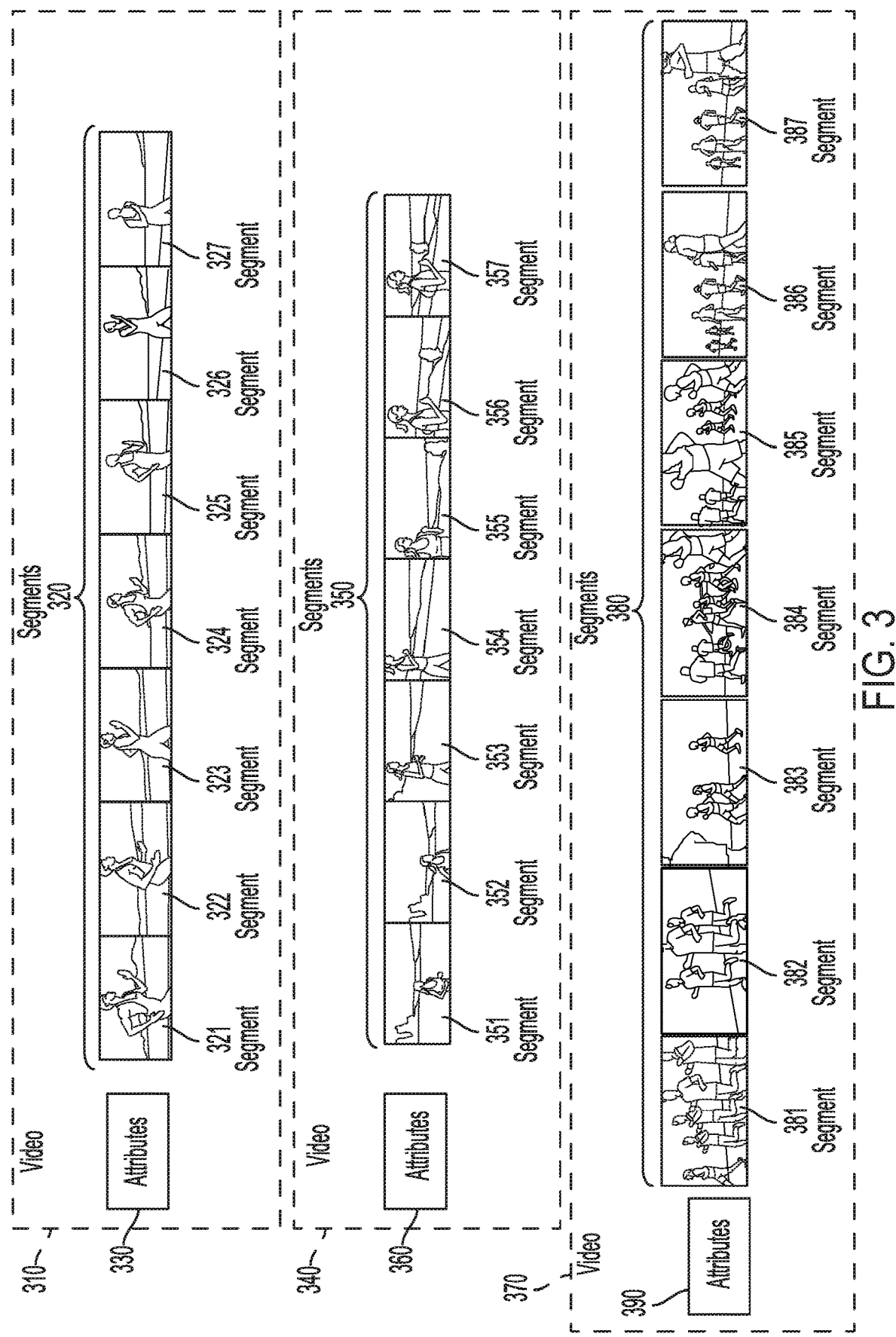
FIG. 3 is a block diagram depicting examples of segments from multiple videos, according to certain embodiments.

In some embodiments, each video in a video library includes multiple segments having respective attributes. FIG. 3 is a diagram depicting examples of segments from multiple videos, such as a first video 310, a second video 340, or a third video 370. In some cases, the videos 310, 340, and 370 are stored in a video library, such as the video library 160 described in regards to FIG. 1.

In FIG. 3, each of the videos 310, 340, and 370 includes multiple segments. The first video 310 includes segments 321, 322, 323, 324, 325, 326, and 327 (collectively referred to herein as segments 320). The second video 340 includes segments 351, 352, 353, 354, 355, 356, and 357 (collectively referred to herein as segments 350). The third video 370 includes segments 381, 382, 383, 384, 385, 386, and 387 (collectively referred to herein as segments 380). Each segment includes one or more sequential frames of the respective video in which the segment is included. Each segment displays an amount of content from the respective video in which the segment is included. In FIG. 3, each of the segments 320 displays an amount of content from the first video 310, each of the segments 350 displays content from the second video 340, and each of the segments 380 displays content from the third video 370. In some cases, each segment for a particular video displays an amount of content based on video characteristics (e.g., lighting, shakiness of camera, point of view). As a non-limiting example, the segment 324 could include a sequence of frames having a particular characteristic of the video 310 (e.g., a profile point of view), and the additional segment 325 could include an additional sequence of frames beginning at a frame in which the characteristic of the video 310 is modified (e.g., a front point of view). In some cases, the amount of content displayed by a particular segment is based on time, such as segments that each have a duration of 1 second. As an additional non-limiting example, each of the segments 380 could include a sequence of frames that encompasses about 1 second of time as displayed in the video 370.

In FIG. 3, each of the videos 310, 340, and 370 includes, or is otherwise associated with, a respective group of multiple attributes. The first video 310 is associated with attributes 330. The second video 340 is associated with attributes 360. The third video 370 is associated with attributes 390. The attributes 330, 360, and 390 indicate one or more characteristics of, respectively, the videos 310, 340, and 370, or of one or more segments included in the respective video. In some cases, the attributes 330, 360, and 390 could indicate content of the respective video or segment, such as a topic, people depicted in the video, a date (e.g., filming date), a location, or other content characteristics. The attributes 330, 360, and 390 could indicate technical characteristics of the respective video or segment, such as a resolution, a file size, a color set (e.g., black and white, red-green-blue, sepia), or other technical characteristics. Furthermore, the attributes 330, 360, and 390 could indicate filming characteristics of the respective video or segment, such as panning (e.g., left/right/up/down motion of the camera), fades, lighting, camera steadiness, or other filming characteristics. As a non-limiting example, the attributes 330 could indicate, for the video 310 or one or more of the segments 320, characteristics of a male person, running, waterfront, panning right, natural lighting, low resolution, and steady camera motion. Additionally or alternatively, the attributes 330 could indicate that segments 321 through 324 have the characteristic of a profile point of view, and that the segments 325 through 327 have the characteristic of a frontal point of view.

In some embodiments, the attributes 330, 360, and 390 are stored in an attribute catalog, such as the attribute catalog 167 described in regards to FIG. 1. In some cases, the attribute catalog is configured such that videos or segments (or both) are searchable based on associated attributes. The attribute catalog can be organized to indicate that a particular attribute is associated with one or more videos or segments. The attribute catalog 167 of FIG. 1 could indicate that an attribute "running" is associated with each of the videos 310, 340, and 370. The attribute catalog 167 could indicate that an attribute "frontal point of view" is associated with the segments 325, 326, 327, 351, and 352. In some cases, attributes in the attribute catalog are categorized based on a characteristic type that is associated with each attribute. As a non-limiting example, attributes such as "Samantha," "male person," or "multiple people" could be categorized as a "person" attribute. As an additional example, attributes such as "outdoor setting," "waterfront," or "London" could be categorized as a "place" attribute. Other categories will be readily apparent to those of ordinary skill in the art. In some cases, an attribute is included in multiple categories. An "outdoors" attribute, for instance, could be included in a "place" category (e.g., an outdoor setting) and also in a "technical" category (e.g., outdoor lighting).

Figure 4:
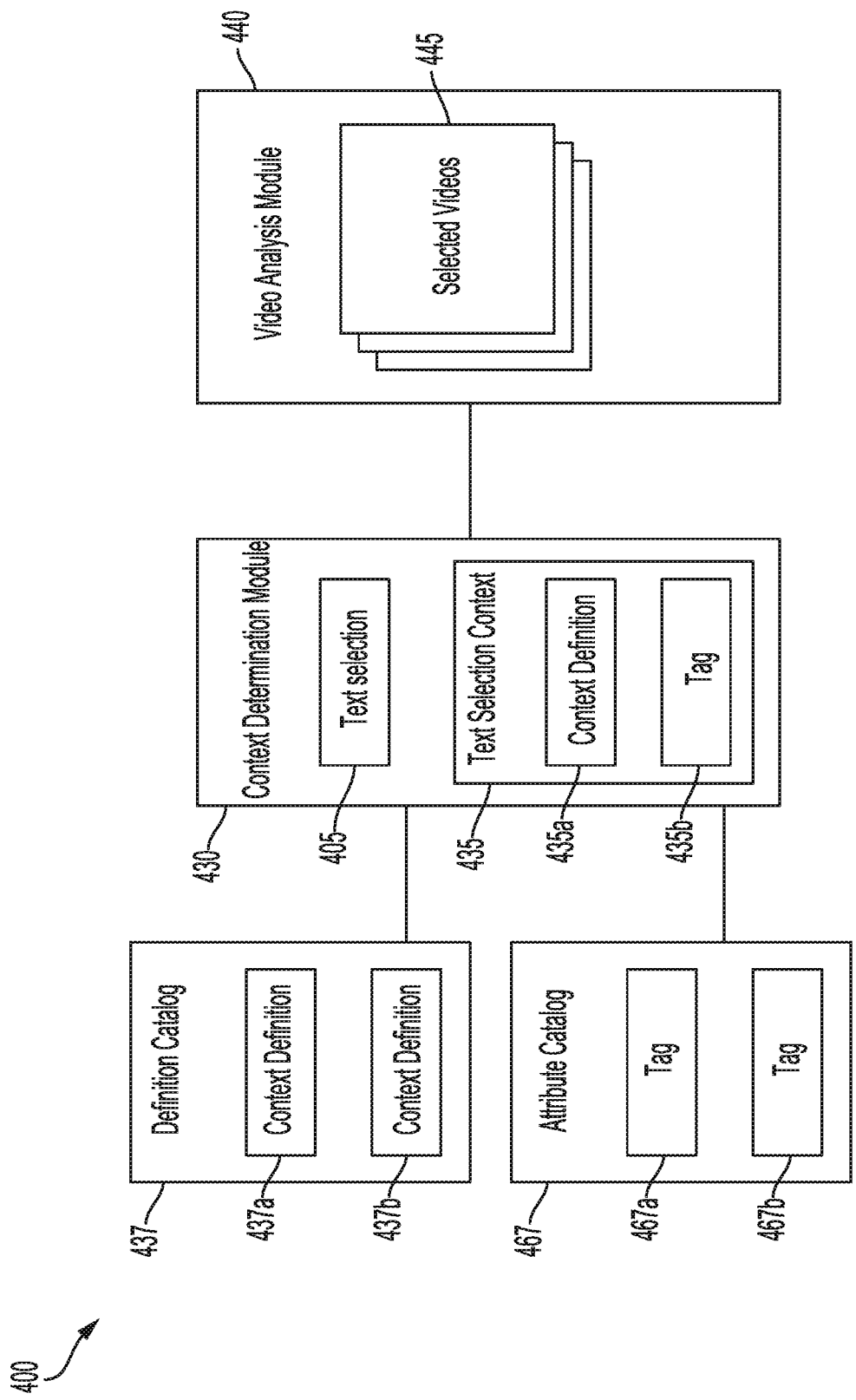
FIG. 4 is a block diagram depicting a computing environment configured to determine a context for a text selection, according to certain embodiments.

In some embodiments, a text selection context is determined by a match between a text selection and one or more entries in a catalog of attributes or definitions. FIG. 4 is a diagram depicting a computing environment 400 in which a context 435 is determined for a text selection 405. The computing environment 400 includes one or more of a context determination module 430 or a video analysis module 440, such as a module included in the video editing application 120 described in regards to FIG. 1. The context determination module 430 can determine a context of a text selection by comparing information from the text selection to entries in an attribute catalog 467 or in a definition catalog 437. In FIG. 4, the catalogs 437 and 467 are depicted as software modules included in the computing environment 400, but other implementations are possible. For example, a catalog could be included within an additional software module or implemented on an additional computing system, such as an attribute catalog included within a video library or a definition catalog included within a context determination module.

In the computing environment 400, the context determination module 430 receives the text selection 405, which includes data indicating one or more character elements, such as alphanumeric characters. The context determination module 430 compares the text selection 405 to one or more entries in the catalogs 437 or 467. In FIG. 4, the context determination module 430 determines a particular characteristic of the text selection 405 by determining a match, or a threshold level of similarity, between text data in the text selection 405 and a particular entry in the catalogs 437 or 467. Responsive to determining the match, the context determination module 430 indicates the particular entry in the text selection context 435.

In some embodiments, a context definition 435a is included in the text selection context 435, responsive to determining a match between the text selection 405 and one or more entries in the definition catalog 437. In some cases, the context definition 435a identifies a category associated with the text selection 405, such as a category included in a predetermined group of definitions. As a non-limiting example, the definition catalog 437 could include a context definition 437a that indicates a "sports" category, and a context definition 437b that indicates a "travel" category. If the text selection 405 includes the characters "run," the context determination module 430 could determine that the text selection 405 is associated with the "sports" category identified by the context definition 437a, and unassociated with the "travel" category identified by the context definition 437b. If the text selection 405 includes the characters "Boston marathon," the context determination module 430 could determine that the text selection 405 is associated with both the "sports" category and the "travel" category respectively identified by the context definitions 437a and 437b.

In some embodiments, a tag 435b is included in the text selection context 435, responsive to determining a match between the text selection 405 and one or more entries in the attribute catalog 467. In some cases, the tag 435b identifies an entity associated with the text selection 405, such as a tag that labels content in one or more videos in a video library (e.g., the video library 160 described in regards to FIG. 1). Tags are included in the attribute catalog 467 based on one or more organizations of videos in the library, such as organization according to a video file name, an album title, a date, content depicted in a video (e.g., user-labeled content, automatic face detection), a video characteristic (e.g., nighttime lighting, filmed via a smartphone), or any other suitable type of organization. As a non-limiting example, the attribute catalog 467 could include a tag 467a that indicates a content entity labeled as "Samantha" (e.g., a person depicted in a video), and a tag 467b that indicates a content entity labeled as "marathons" (e.g., a title of an album of videos). If the text selection 405 includes the characters "run," the context determination module 430 could determine the text selection 405 is associated with the "marathons" entity identified by the tag 467b, and unassociated with the "Samantha" entity identified by the tag 467a. If the text selection 405 includes the characters "Sam's run," the context information module 430 could determine the text selection 405 is associated with both the "Samantha" entity and the "marathons" entity respectively identified by the tags 467a and 467b.

The context determination module 430 generates a text selection context 435 by determining a match between the text selection 405 and entries in the catalogs 437 and 467. In FIG. 4, the text selection context 435 includes at least one context definition 435a and at least one tag 435b. In some cases, the context 435 is a software data structure such as an array, a database record, or another suitable data structure. The context determination module 430 could modify an array to include the context definition 435a and the tag 435b, responsive to a comparison of the text selection 405 to entries in the catalogs 437 and 467.

In some embodiments, the video analysis module 440 selects one or more videos from a video library. In FIG. 4, the video analysis module 440 could select a particular video responsive to determining a match between at least one attribute of the particular video and the text selection context 435. The video analysis module 440 searches a video library and selects a group of videos 445 that each have at least one attribute that matches at least one characteristic identified by the text selection context 435. In FIG. 4, a score for each of the selected videos 445 is determined subsequent to the selection, but other implementations are possible. For example, a video analysis module may determine a score for each video in a video library without performing a selection of the scored videos.

Figure 5:
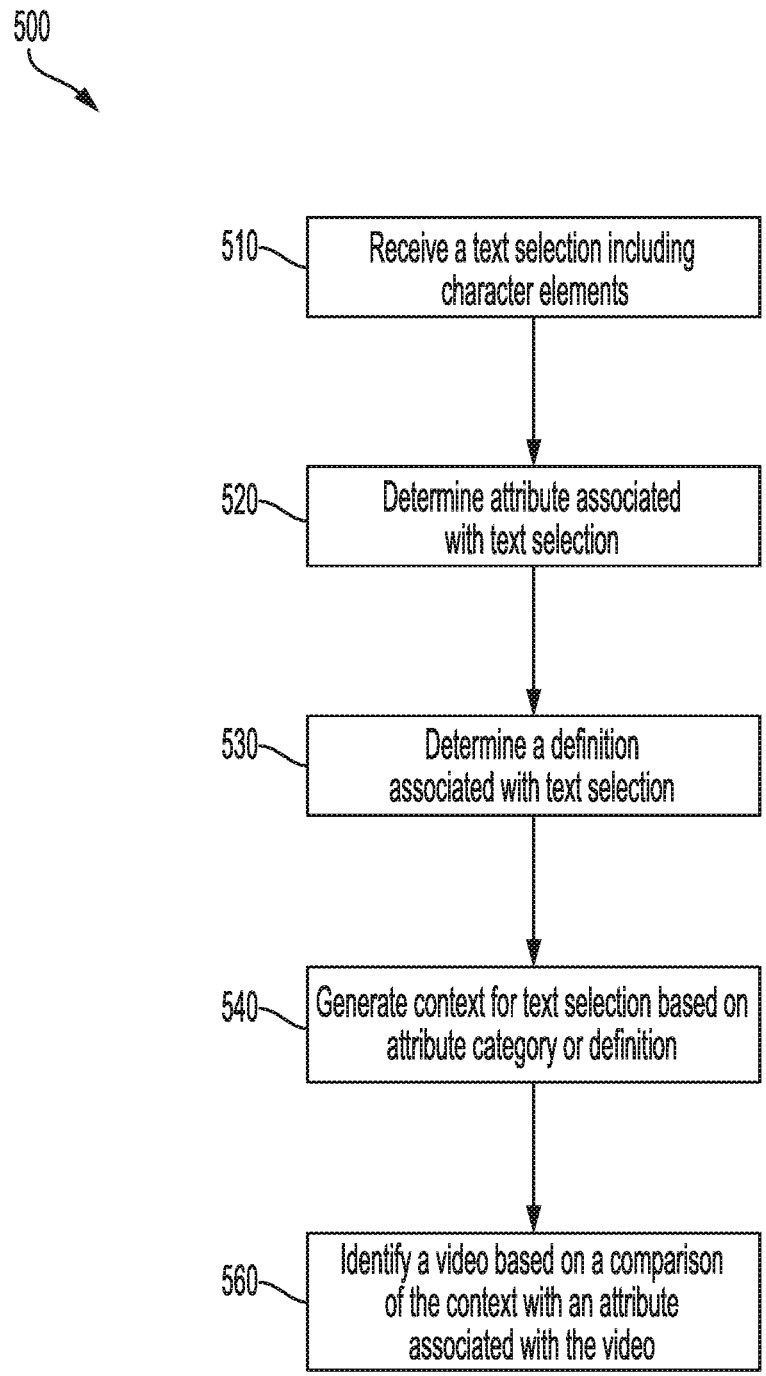
FIG. 5 is a flow chart depicting an example of a process for determining a context of a text selection, according to certain embodiments.

FIG. 5 is a flow chart depicting an example of a process 500 for determining a context of a text selection. In some embodiments, such as described in regards to FIGS. 1-4, a computing device executing a context determination module implements operations described in FIG. 5, by executing suitable program code. For illustrative purposes, the process 500 is described with reference to the examples depicted in FIGS. 1-4. Other implementations, however, are possible.

At block 510, the process 500 involves receiving a text selection that includes one or more character elements, such as alphanumeric character data. In some embodiments, the context determination module 430 receives the text selection 405. The context determination module 430 could receive the text selection 405 via an element of a user interface, such as an element of the user interface 110.

At block 520, the process 500 involves determining one or more video attributes associated with the text selection. The context determination module 430 can determine one or more video attributes, such as tag 435b, associated with the text selection 405. In some cases, the attribute is a tag identifying an entity associated with the text selection. The tag can be included in the attribute catalog 467 according to an organization of a video library. The tag can label content that is included in one or more of the videos in the video library. In some embodiments, the context determination module 430 determines an association between the text selection 405 and a video attribute in the attribute catalog 467. For instance, the context determination module 430 compares character data in the text selection and character data included in the tag. Responsive to determining a match, partial match, semantic similarity, or other correspondence between the text selection and the tag, the context determination module 430 determines an association between the text selection and the tag.

At block 530, the process 500 involves determining one or more context definitions associated with the text selection. The context determination module 430 can determine one or more context definitions 435a associated with the text selection 405. In some cases, the definition identifies a category associated with the text selection. The definition can be included in the definition catalog 437. In some cases, the definition catalog 437 includes a predetermined group of context definitions. The context determination module 430 can determine an association between the text selection 405 and a definition in the definition catalog 437. For instance, the context determination module 430 compares character data in the text selection and character data included in the definition. Responsive to determining a match, partial match, semantic similarity, or other correspondence between the text selection and the definition, the context determination module 430 determines an association between the text selection and the context definition.

At block 540, the process 500 involves generating the context for the text selection based on the video attributes or context definitions associated with the text selection. In some cases, the context determination module 430 generates the text selection context 435 responsive to determining a match (or other correspondence) between a tag or definition and data included in the text selection 405. In some cases, the text selection context 435 is an array, database, or other suitable data structure. The context determination module 430 modifies the array to include the context definition 435a and the tag 435b, responsive to determining a match between the text selection 405 and, respectively, the definition 437a and the tag 467b.

At block 560, the process 500 involves identifying one or more videos based on a comparison of the text selection context with an attribute associated with the video. The video analysis module 440 generates the group of selected videos 445, each selected video having at least one attribute that matches data in the text selection context 435. The video analysis module 440 performs a search of tags included in a video library to determine one or more videos having tags that match one or more characteristics included in the text selection context. In some embodiments, one or more operations related to block 560 are performed prior to determination of a score for a video segment included in the video library. Additionally or alternatively, one or more operations related to block 560 are omitted, such as if a score is determined for each video in the video library (e.g., instead of for only selected videos).

Figure 6:
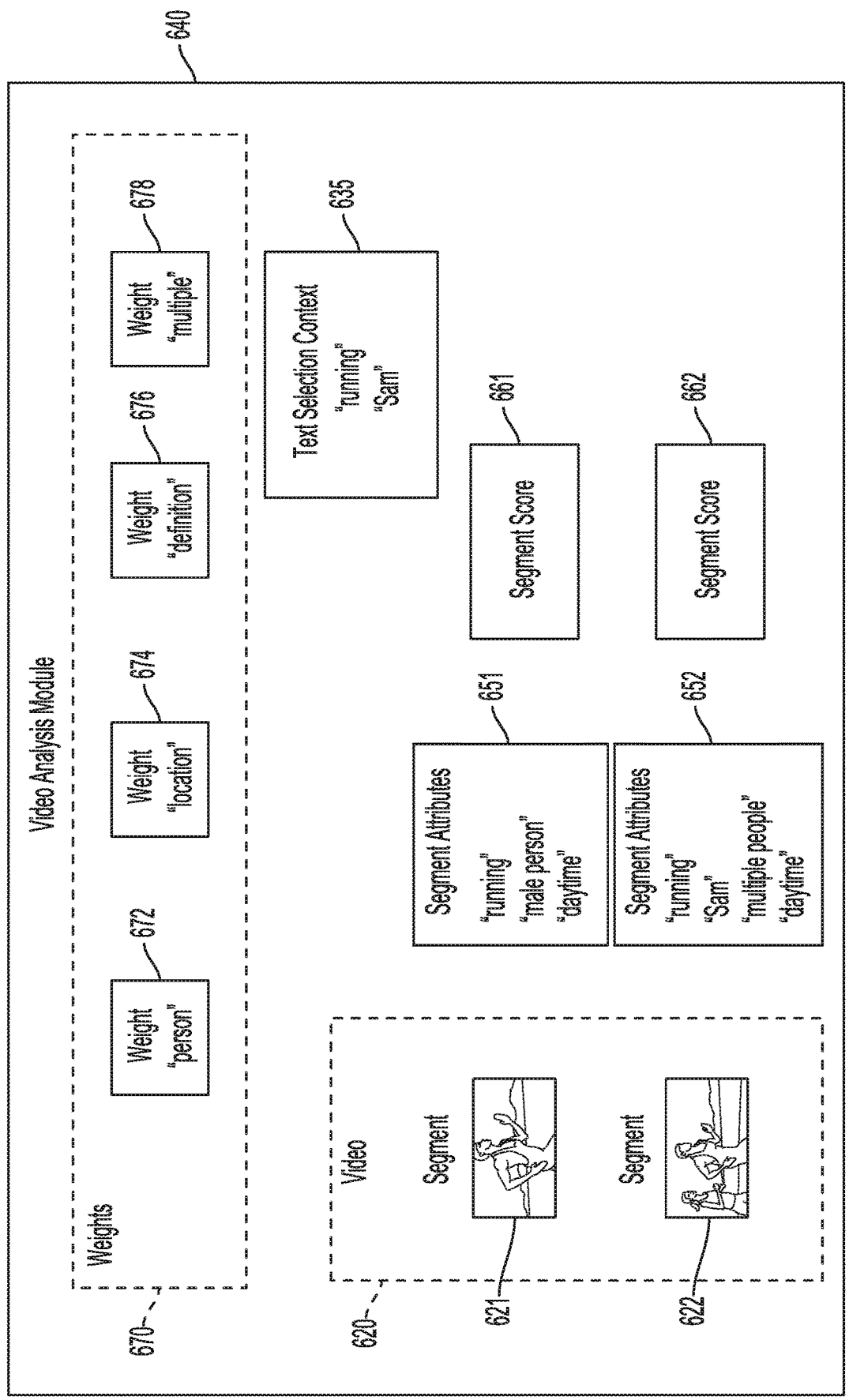
FIG. 6 is a block diagram depicting a video analysis module configured to determine a score for a video segment, according to certain embodiments.

In some embodiments, a score is computed for a video segment, based on a comparison between a text selection context and at least one attribute of the video segment. In some cases, the score for the video segment is computed based on one or more weights that are applied to one or more attributes of the segment. A particular video can have a score that is a combination of respective scores for each segment included in the particular video. FIG. 6 is a diagram depicting a video analysis module 640 that is configured to determine a score for a video segment. In some embodiments, the video analysis module 640 is included in a video editing application, such as the video editing application 120 described in regards to FIG. 1. The score for a video segment is determined from a comparison of a text selection context 635 and an attribute of the video segment. The video analysis module 640 receives the text selection context from a context determination module, e.g., the context determination module 430 described in regards to FIG. 4. In some cases, attributes for a video segment are determined via analysis of a video including the segment, such as an analysis of the videos 170 in the video library 160.

In FIG. 6, a score is computed for each respective segment included in a video, such as a video 620. In some cases, the video 620 includes multiple segments that are associated with respective attributes. In the video 620, a segment 621 is associated with segment attributes 651 and a segment 622 is associated segment attributes 652. Each of the segments 621 and 622 has a respective score, such as segment score 661 associated with segment 621 and segment score 662 associated with segment 622.

In some embodiments, the video analysis module 640 includes (or otherwise accesses) one or more weights 670, via which a score for a segment could be computed. The video analysis module 640 determines a match between one or more of the weights 670 and a respective attribute of the video segments 621 and 622. Responsive to determining the match of a particular weight to the respective attributes, the video analysis module 640 computes the scores 661 and 662 for the respective segments 621 and 622. In some cases, the score for a particular video segment is calculated from a combination of weights that are applied to the attributes of the particular segment.

In FIG. 6, one or more of the weights 670 is applied to the attributes for a respective segment, responsive to determining a match between the attributes and the text selection context 635. Each of the weights 670 indicates a match with a particular type of characteristic of the text selection context 635. For example, and not by way of limitation, the weights 670 could include a weight 672 that indicates a match with a "person" characteristic indicating a person identified in a tag or other cataloged attribute, a weight 674 that indicates a match with a "location" characteristic indicating a place identified in a tag, and a weight 676 that indicates a match with a "definition" characteristic indicating a definition identified in a definition catalog). Furthermore, the weights 670 could include a weight 678 that indicates multiple matches between segment attributes and the context 635.

As a non-limiting example, the text selection context 635 includes the characteristics "running" and "Sam." (e.g., based on analysis of a text selection). The video segment 621 is associated with the segment attributes 651 that include the attributes "running," "male person," and "daytime," and the video segment 622 is associated with the segment attributes 652 that include the attributes "running," "Sam," "multiple people," and "daytime" (e.g., based on analysis of the segments 621 and 622).

In FIG. 6, the video analysis module 640 compares each of the respective attributes of the segments 621 and 622 to the text selection context 635. The video analysis module 640 generates the segment scores 661 and 662 for the respective segments 621 and 622, responsive to determining a match between each segment's respective attributes and a characteristic indicated by at least one of the weights 670. Using the above examples of characteristics, the video analysis module 640 determines a match between the attribute "running" for segment 651 and the characteristic "running" for the context 635. Responsive to determining this match, the video analysis module 640 applies the weight 676 (e.g., indicating a "definition" characteristic) to the attributes 651. The video analysis module 640 computes the segment score 661 from weight 676 applied to the attributes 651. In FIG. 6, the score 661 has a value that is equivalent to the applied weight 676, but other implementations for valuating a score are possible.

Continuing with the above example, the video analysis module 640 determines a match between the attribute "Sam" for segment 652 and the characteristic "Sam" for the context 635, and also determines a match between the attribute "running" for segment 652 and the characteristic "running" for the context 635. Responsive to determining each respective match, the video analysis module 640 applies to the attributes 652 the weight 672 (e.g., indicating a "person" characteristic) and the weight 676 (e.g., indicating a "definition" characteristic). Furthermore, responsive to determining that the attributes 652 match multiple characteristics of the context 635 (e.g., "Sam" and "running"), the video analysis module 640 applies the weight 678 (e.g., indicating multiple matches to multiple characteristics) to the attributes 652. The video analysis module 640 computes the segment score 662 based on a combination of weights applied to the attributes 652. The video analysis module 640 computes the segment score 662 from weights 672, 676, and 678 applied to the attributes 652. In FIG. 6, the score 662 has a value that is equivalent to a summation (or other combination) of the applied weights 672, 676, and 678, but other implementations for valuating a score are possible.

Figure 7:
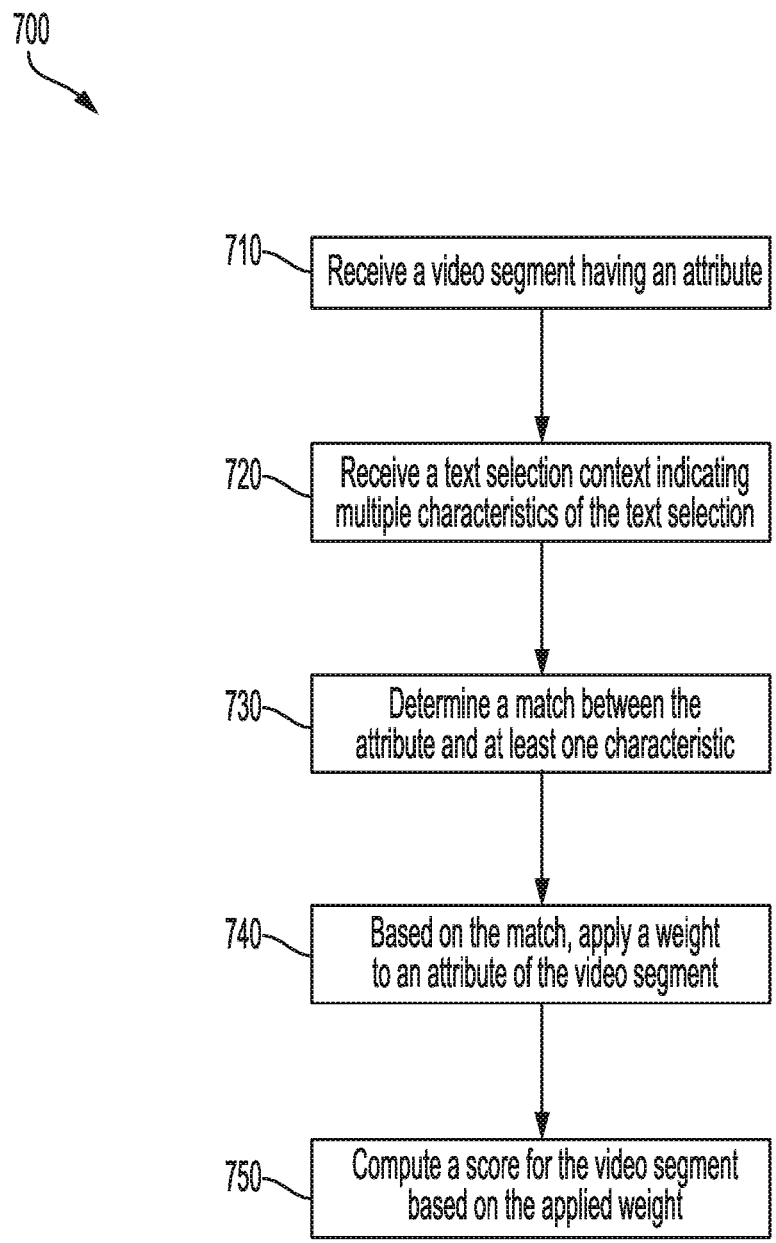
FIG. 7 is a flow chart depicting an example of a process for computing a score for a video segment, according to certain embodiments.

FIG. 7 is a flow chart depicting an example of a process 700 for computing a score for a video segment. In some embodiments, such as described in regards to FIGS. 1-6, a computing device executing a video analysis module implements operations described in FIG. 7, by executing suitable program code. For illustrative purposes, the process 700 is described with reference to the examples depicted in FIGS. 1-6. Other implementations, however, are possible.

At block 710, the process 700 involves receiving a video segment (or an indication of a video segment) that is associated with one or more attributes. For example, the video analysis module 640 receives the video segments 621 and 622. The video analysis module 640 receives respective attributes for each segment, such as the attributes 651 and 652 associated with the respective segments 621 and 622. In some cases, the video segment, segment attribute, or both, are received from a video library.

At block 720, the process 700 involves receiving a text selection context that is associated with a text selection. The text selection context indicates one or more characteristics of the associated text selection, such as a tag identifying an entity or a context definition identifying a category. The video analysis module 640 receives the text selection context 635 from a context determination module, such as the context determination module 430.

At block 730, the process 700 involves determining a match between an attribute associated with the video segment and a characteristic of the text selection context. The video analysis module 640 determines a match between the data "running" in the attribute 651 and additional data "running" in a characteristic for the context 635. In some cases, the match between the attribute and the characteristic is based on a threshold similarity, including (without limitation) a threshold semantic similarity. For instance, the video analysis module 640 could determine that an attribute "running" is within a threshold similarity to a characteristic "runs." Additionally or alternatively, the video analysis module could determine that the attribute "running" is within a threshold semantic similarity to a characteristic "jogging."

At block 740, the process 700 involves applying a weight to the attribute of the video segment. In some cases, applying the weight to the attribute is responsive to determining a match between the attribute and a characteristic of the text selection context, such as described in regards to block 730. Applying the weight to the attribute could be responsive to determining a match between the attribute and a particular type of characteristic. The video analysis module 640 could apply the weight 676 to the attributes 651 responsive to determining that at least one of the attributes 651 (e.g., example of an attribute "running") matches a "definition" type of characteristic in the context 635 (e.g., example of an characteristic "running").

In some embodiments, applying the weight to the attribute is responsive to determining that multiple attributes match multiple respective characteristics of the text selection context. In FIG. 6, the video analysis module 640 could apply the weights 672 and 676 to the attributes 652 responsive to determining that respective ones of the attributes 652 match a "person" type or a "definition" type of characteristics in the context 635. The video analysis module 640 could apply the weight 678 to the attributes 652 responsive to determining that multiple ones of the attributes 652 match multiple types of characteristics in the context 635.

In some embodiments, a weight indicating multiple matches is applied responsive to determining that a threshold quantity of attributes match respective characteristics of the text selection context. For instance, a particular weight indicating three or more matches is applied to a group of attributes that matches three or more characteristics. In some embodiments, additional weights may indicate additional matches. For example, a first weight indicating at least two matches is applied to a first group of attributes that matches two characteristics of the text selection context. Additionally or alternatively, a second weight indicating at least three matches is applied to a second group of attributes that matches three characteristics of the text selection context. In some cases, the second group of attributes also has the first weight applied (e.g., indicating at least two matches).

In some embodiments, one or more operations related to blocks 730 or 740 are repeated for multiple attributes. In FIG. 6, the video analysis module 640 could determine, for each attribute associated with a respective video segment, whether the attribute matches one or more characteristics in the text selection context, and applies one or more weights to each of the attributes that matches a characteristic type indicated by the respective weights. As a non-limiting example, for each attribute "running," "male person," and "daytime" in attributes 651, the video analysis module 640 performs operations to determine whether the attribute matches one or more of the characteristics "running" and "Sam" in the context 635, and performs additional operations to apply a respective weight that indicates a type (e.g., "definition," "person") of the characteristics.

At block 750, the process 700 involves computing a score for the video segment, based on the applied weight. In some cases, the score is computed from a combination of multiple weights that are applied to one or more attributes of the video segment, such as a summation, product, or other suitable combination of one or more weights applied to the attributes. In FIG. 6, the video analysis module 640 computes the score 662 for the segment 622, based on a combination of the weights 672, 676, and 678 applied to the attributes 652.

In some embodiments, one or more operations related to the process 700 are repeated, such as for one or more of multiple video segments or multiple videos. For instance, for each respective video in a group of videos (e.g., the videos 170), the video analysis module 640 could compare attributes of segments in the respective video to characteristics in the text selection context. The video analysis module 640 could compute a score for each segment in each of the videos, from a combination of weights applied to respective attributes of each segment.

FIG. 7 depicts an example of a technique for determining a score of a video segment. However, other techniques for determining a segment score are possible, and will be apparent to one of ordinary skill in the art.

Figure 8:
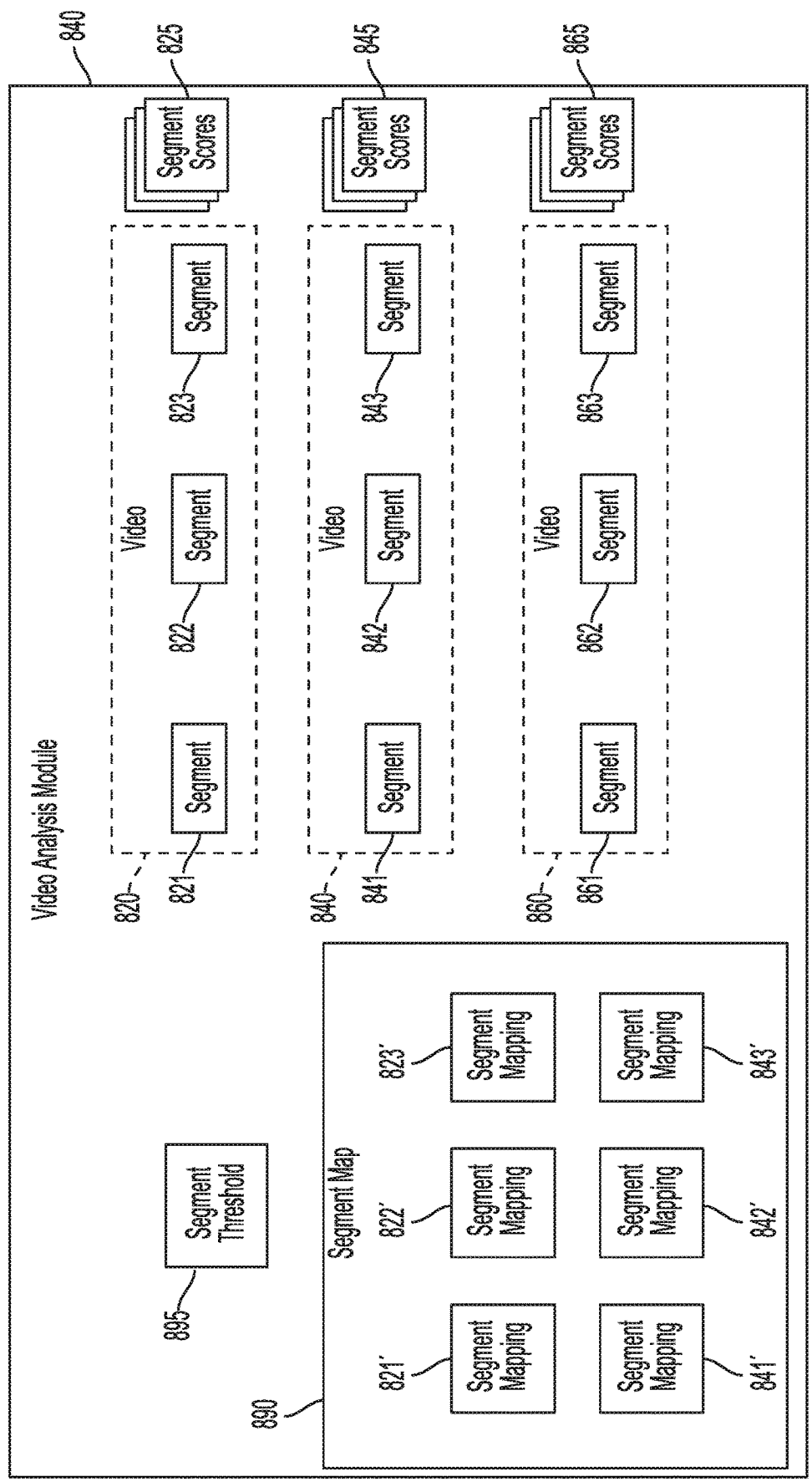
FIG. 8 depicts an example of a video analysis module configured to generate a segment map indicating a respective score of each segment, according to certain embodiments.

In some embodiments, scored video segments are selected for inclusion in a composite video that displays video-filled text based on a text selection. The segments are selected based on each segment's position in a segment map. FIG. 8 depicts an example of a video analysis module 840 that is configured to generate a segment map, such as a segment map 890. The video analysis module 840 is included in a video editing application, such as the video application 120 described in regards to FIG. 1. The segment map 890 indicates a respective score of each segment. The segment map 890 could also indicate one or more qualities of the mapped segments or of the videos in which the mapped segments are included.

The video analysis module 840 receives one or more videos that include multiple segments, each segment having a score. The video analysis module 840 could generate (or otherwise receive) the scores for video segments, such as described in regards to FIG. 6. In FIG. 8, the video analysis module 840 receives a video 820 having segments 821, 822, and 823; a video 840 having segments 841, 842, and 843; and a video 860 having segments 861, 862, and 863. Each segment in the videos 820, 840, and 860 is associated with a respective segment score, such as segment scores 825 associated with segments 821, 822, and 823; segment scores 845 associated with segments 841, 842, and 843; and segment scores 865 associated with segments 861, 862, and 863.

In some embodiments, the video analysis module 840 generates the segment map 890 based on one or more segments that have respective scores that fulfill a segment threshold 895. In FIG. 8, the video analysis module 840 compares each of the scores 825, 845, and 865 to the segment threshold 895. As a non-limiting example, the video analysis module determines that the respective segment scores for segments 821, 823, 842, and 843 fulfill the threshold 895, and that the respective segment scores for segments 822, 841, 861, 862, and 863 do not fulfill the threshold 895. Whether a score fulfills the segment threshold 895 is determined via any suitable comparison technique, such as a score that is greater than or equal to a threshold value, or less than the threshold value, or another suitable comparison (or combination of comparisons).

In some cases, the segment map 890 indicates a video that has at least one segment with a score that fulfills the segment threshold 895. Responsive to determining that the video 820 has at least one segment with a score that fulfills the threshold 895, the video analysis module 840 generates the map 895 including segment mappings 821', 822', and 823', indicating respective segments 821, 822, and 823 of video 820. Responsive to determining that the video 840 has at least one segment with a score that fulfills the threshold 895, the map 895 is generated to include segment mappings 841', 842', and 843', indicating respective segments 841, 842, and 843 of video 840. In FIG. 8, the video analysis module 840 generates the map 890 omitting an indication of video 860, responsive to determining that the video 860 does not have at least one segment with a score that fulfills the threshold 895. In some cases, the segment map 890 indicates videos based on a characteristic of the indicated videos (or an included segment), such as a date (e.g., a filming date, a modification date), a technical characteristic (e.g., a resolution, a screen ratio, a color palette), or a filming characteristic (e.g., blur, high activity, camera motion, lighting). Responsive to determining that the video 820 has a date indicating a more recent filming than the video 840, for instance, the video analysis module 840 could generate the map 890 indicating the video 820 prior to indicating the video 840 (e.g., in order of most recent video first).

In FIG. 8, the segment map 890 indicates each segment that has a score fulfilling the threshold 895. The mappings 821', 823', 842', and 843' include data indicating that the respective segments 821, 823, 842, and 843 have scores fulfilling the threshold 895. The mappings 822' and 841' include data indicating that the respective segments 822 and 841 have scores that do not fulfill the threshold 895. In some cases, the segment map 890 includes additional data describing the mapped segments 821-823 and 841-843, such as one or more timestamps for each segment (e.g., start time, end time), saliency data indicating salient objects (e.g., areas depicting distinctive visual content) of each segment, face location data (e.g., areas depicting faces), or other suitable information about the mapped segments.

Figure 9:
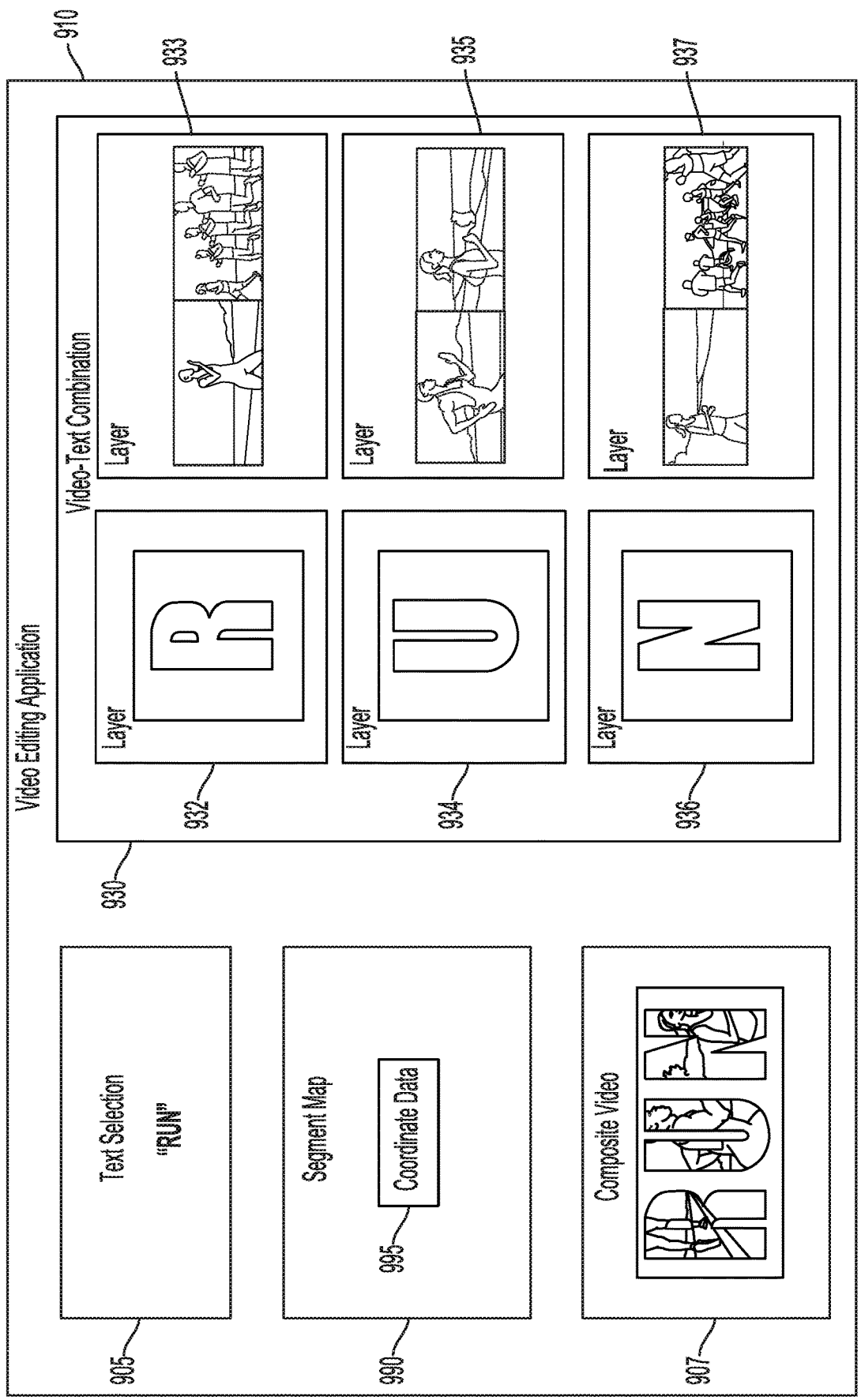
FIG. 9 depicts an example of a video editing application configured to generate a video-text combination, according to certain embodiments.

In some embodiments, one or more segments is selected for a composite video that displays video-filled text, based on data included in a segment map. The composite video includes a combination of video segments and character elements. FIG. 9 depicts an example of a video editing application 910 that is configured to generate a video-text combination 930. The video editing application 910 is further configured to generate, based on the combination 930, a composite video 907 that displays video-filled text. The video-text combination 930 includes one or more segments that are indicated in a segment map 990, and one or more character elements that are included in a text selection 905.

In FIG. 9, the video editing application 910 receives the text selection 905 (e.g., via a user interface). The text selection 905 includes one or more characters, such as the examples of alphanumeric characters "RUN." The video editing application 910 receives the segment map 990, which indicates one or more video segments having scores that fulfill a segment threshold, e.g., as described in regards to FIG. 8.

The video editing application 910 determines one or more layers corresponding to character data in the text selection 905. In some embodiments, each layer generated by the video editing application 910 provides a working area in which video data may be generated or modified. Based on the characters "RUN," the video editing application 910 generates a particular layer that is associated with a particular one of the character elements. For example, a layer 932 includes data generated based on the character "R," a layer 934 includes data generated based on the character "U," and a layer 936 includes data generated based on the character "N." In some cases, a particular layer includes a matte, or other video data, describing a form of the particular associated character. The described form could include, without limitation, a shape, an area, an outline, or any other suitable form of the associated character. In FIG. 9, the layer 932 includes a diagrammatic depiction of a video matte having a transparent area within boundaries of the character "R" and opaque areas outside of the character boundaries, but other implementations are possible. For instance, a layer associated with a character could include opaque areas within the character boundaries and transparent areas outside of the boundaries, or opaque areas delineating the boundaries of the character and transparent areas within and without the delineated boundaries, or other suitable configurations of mattes.

The video editing application 910 further determines one or more layers corresponding to video segments indicated by the segment map 990. Continuing with the above example, the video editing application 910 generates a layer 933 associated with layer 932, a layer 935 associated with layer 934, and a layer 937 associated with layer 936. Each of the layers 933, 935, and 937 includes video data from one or more video segments indicated by the map 990. In FIG. 9, the layers 933, 935, and 937 include a diagrammatic depiction of two video segments, but other implementations are possible. For example, a layer associated with a video segment could include a single video segment, additional video segments (e.g., two or more), still images (e.g., digital photographs), animated images, or any suitable type of visual data or combination of visual data.

In some cases, the video-text combination 930 is generated such that a particular layer including a segment is arranged such that the segment is visible in combination with an associated layer describing a text character. In FIG. 9, the video-text combination 930 superimposes the associated layers 932 and 933 such that video segment data in the layer 933 is visible through transparent areas of the matte in the associated layer 932. Layer 934 is superimposed on layer 935, and layer 936 is superimposed on layer 937. In some configurations, the video-text combination 930 arranges a particular layer including a video segment such that the segment is not visible in combination with an additional layer that is not associated with the particular layer. In FIG. 9, for instance, layer 933 is cropped such that video segment data in the layer 933 is omitted from (e.g., not visible through) the transparent areas of the matte in the unassociated layer 934. In some cases, the video-text combination 930 is generated such that multiple segments included in a particular layer are sequentially viewable. For example, a particular layer is generated such that a subsequent segment is appended to prior segment, such that the beginning timestamp of the subsequent segment follows the ending timestamp of the prior segment. In some cases, both the prior and subsequent segments are viewable in combination with an additional layer (e.g., sequentially viewable through a character matte).

In some embodiments, the video editing application 910 selects multiple segments for inclusion in a particular layer based on data included in the segment map 990. As an example, video editing application 910 selects video segments for the layers 933, 935, and 937 responsive to determining that each segment has a respective score that is above a threshold value (e.g., as described in regards to FIG. 8). In some cases, the video segments in the layers 933, 935, and 937 could be selected based on additional data indicated by the segment map 990, such as data indicating a respective date of each segment (e.g., most recently filmed segments), a timestamp indicating a duration of each respective segment, a filming characteristic, a technical characteristic, or other suitable information. The video editing application 910 could select segments based on a video in which the segment is included. For example, a segment from a first video is sequentially followed by a segment from a second video that is different from the first video. In some cases, selecting segments for a particular layer based on the videos including the segments increases diversity of segments visible in a particular letter, and increases engagement or enjoyment for a viewer of a composite video based on the diverse segments.

In some embodiments, a videographic transition, such as a cut, fade, dissolve, wipe, or other videography transition technique, is applied to multiple segments in a particular layer. Additionally or alternatively, a particular layer could be configured to loop the one or more video segments included in the particular layer. In FIG. 9, the video editing application 910 applies a cut transition to the segments in layer 933, and configures the segments to loop, such that playback of a final segment is followed by playback of an initial segment (e.g., playback loops to the beginning of the layer's video data).

In some embodiments, the video editing application 910 is configured to modify a relative position of a first layer with regards to a second layer, based on content that is included in one or more of the first or second layers. The position is modified, for instance, such that an object region in a video segment is located within a transparent area of a character matte, e.g., in an associated layer. The object region could include a region of the video segment that depicts a face, a salient object, and object indicated by the user (e.g., selected via an input to a user interface), or another suitable region of content depicted by the video segment. In FIG. 9, coordinate data 995 is included in the segment map 990. The coordinate data 995 describes an object region of at least one video segment indicated by the map 990. Based on the coordinate data 995, the video editing application 910 determines a position of an object region within frames of one or more segments in the layer 933. The video editing application 910 also determines a relative location of one or more character elements in the layer 932, such as a relative location of the "R" in the character matte. In some cases, the relative location of the character element is described by additional coordinate data (e.g., additional coordinates describing transparent areas of a character matte). The video editing application 910 compares the coordinate data describing the position of the object region and the relative location of the character element. Responsive to determining an overlap indicated by the coordinate data, the video editing application 910 modifies a position of the video segment to include the object region in the combination of the segment and the character element. As an example, a segment in the layer 933 could be panned, zoomed, or otherwise modified such that an object region of the segment (e.g., a face, a figure) is superimposed with character element (e.g., the outline of the "R") in layer 932.

In FIG. 9, the video editing application 910 is configured to generate the composite video 907 based on the video-text combination 930. The video editing application 910 renders a development file that includes the combination 930, such that the rendered file includes the composite video 907. In some cases, rendering includes converting a development file (e.g., a .pproj file type, a .prel file type), in which video data may be edited in one or more layers, to a video file that is viewable via a video-viewing application (e.g., a .mov file type, a .mp4 file type). The composite video 907 includes video data that depicts each of the character elements from the text selection 905 (e.g., character mattes included in the layers 932, 934, and 936) superimposed (or otherwise combined with) video content of the segments selected based on respective segment scores (e.g., segments included in layers 933, 935, and 937).

Figure 10:
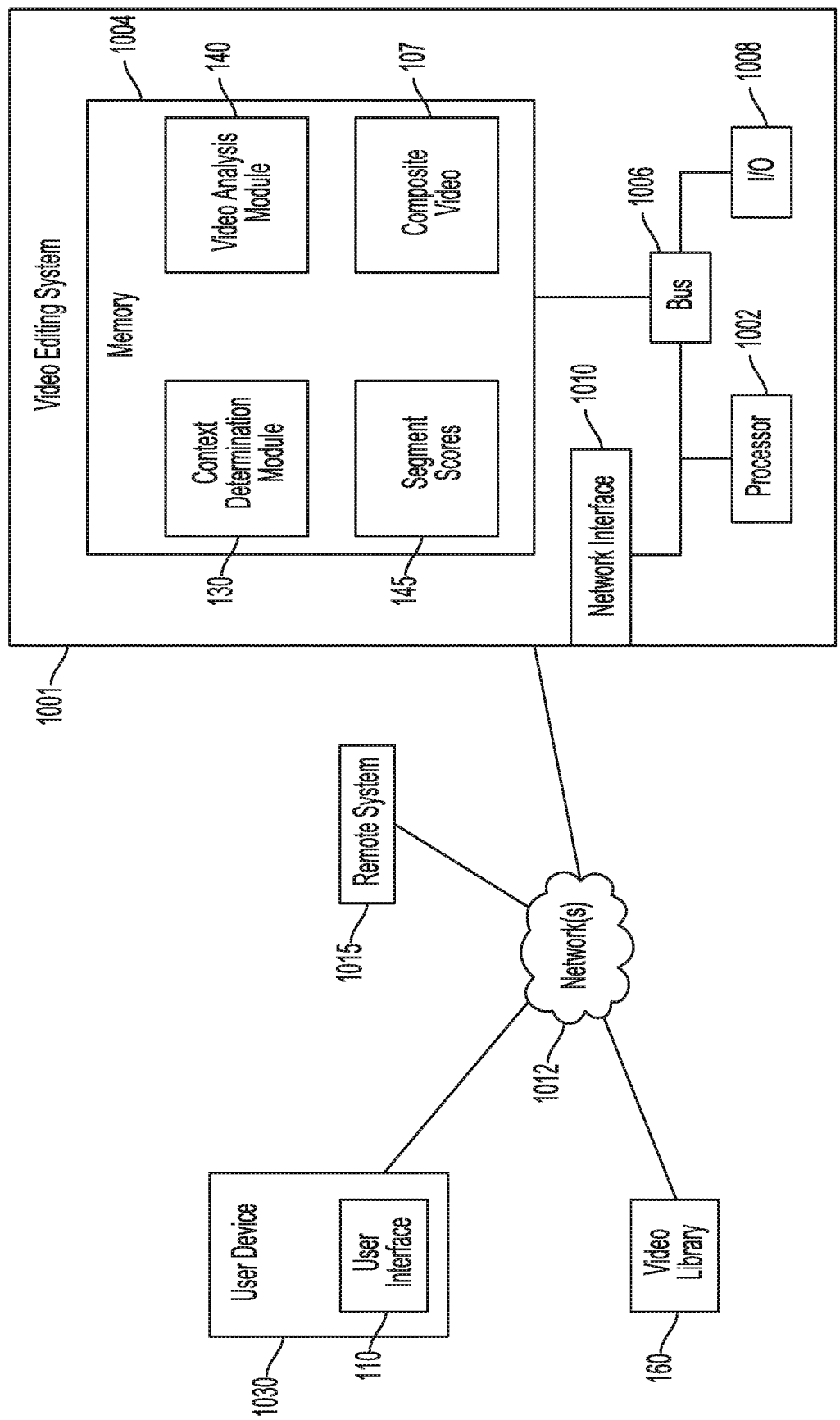
FIG. 10 is a block diagram depicting an example of a video editing computing system that is configured to select context-sensitive video segments for generation of video-filled text, according to certain embodiments.

Any suitable computing system or group of computing systems can be used for performing the operations described herein. For example, FIG. 10 is a block diagram depicting a video editing computing system 1001 that is configured to select context-sensitive video segments for generation of video-filled text, according to certain embodiments.

The depicted example of a video editing system 1001 includes one or more processors 1002 communicatively coupled to one or more memory devices 1004. The processor 1002 executes computer-executable program code or accesses information stored in the memory device 1004. Examples of processor 1002 include a microprocessor, an application-specific integrated circuit ("ASIC"), a field-programmable gate array ("FPGA"), or other suitable processing device. The processor 1002 can include any number of processing devices, including one.

The memory device 1004 includes any suitable non-transitory computer-readable medium for storing the context determination module 130, the video analysis module 140, the segment scores 145, the composite video 107, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The video editing system 1001 may also include a number of external or internal devices such as input or output devices. For example, the video editing system 1001 is shown with an input/output ("I/O") interface 1008 that can receive input from input devices or provide output to output devices. A bus 1006 can also be included in the video editing system 1001. The bus 1006 can communicatively couple one or more components of the video editing system 1001.

The video editing system 1001 executes program code that configures the processor 1002 to perform one or more of the operations described above with respect to FIGS. 1-9. The program code includes operations related to, for example, one or more of the context determination module 130, the video analysis module 140, the segment scores 145, the composite video 107, or other suitable applications or memory structures that perform one or more operations described herein. The program code may be resident in the memory device 1004 or any suitable computer-readable medium and may be executed by the processor 1002 or any other suitable processor. In some embodiments, the program code described above, the context determination module 130, the video analysis module 140, the segment scores 145, and the composite video 107 are stored in the memory device 1004, as depicted in FIG. 10. In additional or alternative embodiments, one or more of the context determination module 130, the video analysis module 140, the segment scores 145, the composite video 107, and the program code described above are stored in one or more memory devices accessible via a data network, such as a memory device accessible via a cloud service.

The video editing system 1001 depicted in FIG. 10 also includes at least one network interface 1010. The network interface 1010 includes any device or group of devices suitable for establishing a wired or wireless data connection to one or more data networks 1012. Non-limiting examples of the network interface 1010 include an Ethernet network adapter, a modem, and/or the like. A remote system 1015 is connected to the video editing system 1001 via network 1012, and remote system 1015 can perform some of the operations described herein, such as determining attributes of videos. A user computing device 1030 is connected to the video editing system 1001 via network 1012, and the user computing device 1030 can perform some of the operations described herein, such as receiving inputs or providing outputs via the user interface 110. The video editing system 1001 is able to communicate with one or more of the remote computing system 1015, the user computing device 1030, or the video library 160 using the network interface 1010. Although FIG. 10 depicts the user interface 110 (e.g., via the user device 1030) and the video library 160 as connected to video editing system 1001 via the networks 1012, other embodiments are possible, including the video library 160 or the user interface 110 running as programs in the memory 1004 of video editing system 1001.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of producing context-aware video-filled text, the method comprising:
    receiving a text selection that includes a plurality of character elements;
    determining a text selection context identifying a characteristic of the text selection, the text selection context including (i) a tag identifying an entity associated with the text selection and (ii) a context definition identifying a category associated with the text selection;
    computing a first score for a first video segment and a second score for a second video segment, wherein each score for a respective video segment is computed based on a match between an attribute of the respective video segment and the text selection context;
    determining, based on a comparison of a segment threshold to the score for the respective video segment, that the first score fulfills the segment threshold and the second score does not fulfill the segment threshold;
    responsive to determining that the first score fulfills the segment threshold, generating a composite video including a combination of the first video segment and a character element from the plurality of character elements, wherein the combination includes an outline of the character element superimposed onto the first video segment; and
    updating a user interface to display the composite video.

2. The method of claim 1, wherein generating the composite video further comprises:
    determining an ending timestamp of the first video segment;

determining a beginning timestamp of an additional video segment having an additional score that fulfills the segment threshold; and appending the additional video segment subsequent to the first video segment, such that the beginning timestamp is subsequent to the ending timestamp, wherein the combination further includes the outline of the character element superimposed onto the first video segment and the subsequent additional video segment.

3. The method of claim 1, wherein computing the each score for the respective video segment further comprises:

responsive to determining that the attribute matches a first characteristic of the text selection context, applying a first weight to the attribute;

responsive to determining that the attribute matches a second characteristic of the text selection context, applying a second weight to the attribute;

responsive to determining that multiple attributes of the respective video segment match the first characteristic and the second characteristic, applying a third weight to the attribute; and computing the each score for the respective video segment based on a combination of the first weight, the second weight, and the third weight.

4. The method of claim 1, wherein the attribute associated with the respective video segment indicates one or more of: a face of a person, a geographical location, a video subject, or a video filming technique.

5. The method of claim 1, wherein the tag includes one or more of a name of a person, a name of a location, or a user-provided descriptor, and wherein the context definition includes one or more of an activity category, a film technique category, or an event category.

6. The method of claim 1, wherein generating the composite video further comprises:

determining an object region of the first video segment, the object region indicating an area depicting a face of a person;

determining a series of coordinates of the object region, the series of coordinates indicating respective positions of the object region within respective frames of the first video segment; and panning the first video segment based on the series of coordinates, wherein the combination includes the outline of the character element superimposed onto the object region during each respective frame of the panned first video segment.

7. The method of claim 1, wherein the plurality of character elements included in the text selection comprise a word, and wherein the text selection context includes one or more of (i) the tag identifying the entity, wherein the entity is described by the word, or (ii) the context definition, wherein the context definition is based on a linguistic definition of the word.

8. The method of claim 1, wherein generating the composite video further comprises:

determining an additional video segment having an additional score that fulfills the segment threshold; and generating an additional combination of the additional video segment and an additional character element from the plurality of character elements, wherein the combination further includes an additional outline of the additional character element superimposed onto the additional video segment.

9. A non-transitory computer-readable medium embodying program code for producing context-aware video-filled text, the program code comprising instructions which, when executed by a processor, cause the processor to perform operations comprising:

receiving a text selection that includes a plurality of character elements;

determining a text selection context identifying a characteristic of the text selection, the text selection context including (i) a tag identifying an entity associated with the text selection and (ii) a context definition identifying a category associated with the text selection;

computing a first score for a first video segment and a second score for a second video segment, wherein each score for a respective video segment is computed based on a match between an attribute of the respective video segment and the text selection context;

determining, based on a comparison of a segment threshold to the score for the respective video segment, that the first score fulfills the segment threshold and the second score does not fulfill the segment threshold;

responsive to determining that the first score fulfills the segment threshold, generating a composite video including a combination of the first video segment and a character element from the plurality of character elements, wherein the combination includes an outline of the character element superimposed onto the first video segment; and updating a user interface to display the composite video.

10. The non-transitory computer-readable medium of claim 9, wherein computing the each score for the respective video segment further comprises:

responsive to determining that the attribute matches a first characteristic of the text selection context, applying a first weight to the attribute;

responsive to determining that the attribute matches a second characteristic of the text selection context, applying a second weight to the attribute;

responsive to determining that multiple attributes of the respective video segment match the first characteristic and the second characteristic, applying a third weight to the attribute; and computing the each score for the respective video segment based on a combination of the first weight, the second weight, and the third weight.

11. The non-transitory computer-readable medium of claim 9, wherein generating the composite video further comprises:

determining an object region of the first video segment, the object region indicating an area depicting a face of a person;

determining a series of coordinates of the object region, the series of coordinates indicating respective positions of the object region within respective frames of the first video segment; and panning the first video segment based on the series of coordinates, wherein the combination includes the outline of the character element superimposed onto the object region during each respective frame of the panned first video segment.

12. The non-transitory computer-readable medium of claim 9, wherein the plurality of character elements included in the text selection comprise a word, and wherein the text selection context includes one or more of (i) the tag identifying the entity, wherein the entity is described by the word, or (ii) the context definition, wherein the context definition is based on a linguistic definition of the word.

13. The non-transitory computer-readable medium of claim 9, wherein generating the composite video further comprises:
    determining an additional video segment having an additional score that fulfills the segment threshold; and
    generating an additional combination of the additional video segment and an additional character element from the plurality of character elements, wherein the combination further includes an additional outline of the additional character element superimposed onto the additional video segment.

14. A system for producing context-aware video-filled text, the system comprising:
    a processor configured for receiving a text selection that includes a plurality of character elements;
    a means for determining a text selection context identifying a characteristic of the text selection, the text selection context including (i) a tag identifying an entity associated with the text selection and (ii) a context definition identifying a category associated with the text selection;
    a means for computing a first score for a first video segment and a second score for a second video segment, wherein each score for a respective video segment is computed based on a match between an attribute of the respective video segment and the text selection context;
    a means for determining, based on a comparison of a segment threshold to the score for the respective video segment, that the first score fulfills the segment threshold and the second score does not fulfill the segment threshold; and
    a means for generating, responsive to determining that the first score fulfills the segment threshold, a composite video including a combination of the first video segment and a character element from the plurality of character elements, wherein the combination includes an outline of the character element superimposed onto the first video segment,
    wherein the processor is further configured for updating a user interface to display the composite video.

15. The system of claim 14, wherein generating the composite video further comprises:
    determining an ending timestamp of the first video segment;
    determining a beginning timestamp of an additional video segment having an additional score that fulfills the segment threshold; and
    appending the additional video segment subsequent to the first video segment, such that the beginning timestamp is subsequent to the ending timestamp, wherein the combination further includes the outline of the character element superimposed onto the first video segment and the subsequent additional video segment.

16. The system of claim 14, wherein computing the each score for the respective video segment further comprises:
    responsive to determining that the attribute matches a first characteristic of the text selection context, applying a first weight to the attribute;
    responsive to determining that the attribute matches a second characteristic of the text selection context, applying a second weight to the attribute;
    responsive to determining that multiple attributes of the respective video segment match the first characteristic and the second characteristic, applying a third weight to the attribute; and
    computing the each score for the respective video segment based on a combination of the first weight, the second weight, and the third weight.

17. The system of claim 14, wherein the attribute associated with the respective video segment indicates one or more of a face of a person, a geographical location, a video subject, or a video filming technique,
    wherein the tag includes one or more of a name of a person, a name of a location, or a user-provided descriptor, and
    wherein the context definition includes one or more of an activity category, a film technique category, or an event category.

18. The system of claim 14, wherein generating the composite video further comprises:
    determining an object region of the first video segment, the object region indicating an area depicting a face of a person;
    determining a series of coordinates of the object region, the series of coordinates indicating respective positions of the object region within respective frames of the first video segment; and
    panning the first video segment based on the series of coordinates, wherein the combination includes the outline of the character element superimposed onto the object region during each respective frame of the panned first video segment.

19. The system of claim 14, wherein the plurality of character elements included in the text selection comprise a word, and
    wherein the text selection context includes one or more of (i) the tag identifying the entity, wherein the entity is described by the word, or (ii) the context definition, wherein the context definition is based on a linguistic definition of the word.

20. The system of claim 14, wherein generating the composite video further comprises:
    determining an additional video segment having an additional score that fulfills the segment threshold; and
    generating an additional combination of the additional video segment and an additional character element from the plurality of character elements, wherein the combination further includes an additional outline of the additional character element superimposed onto the additional video segment.

* * * * *